(12) United States Patent
Takahashi et al.

(10) Patent No.: US 8,244,046 B2
(45) Date of Patent: Aug. 14, 2012

(54) CHARACTER STRING UPDATED DEGREE EVALUATION PROGRAM

(75) Inventors: Masayuki Takahashi, Nagaoka (JP); Yoshiki Mikami, Tokyo (JP); Katsuko T. Nakahira, Tokyo (JP)

(73) Assignee: Nagaoka University of Technology, Niigata (JP)

( * ) Notice: Subject to any disclaimer, the term of this patent is extended or adjusted under 35 U.S.C. 154(b) by 940 days.

(21) Appl. No.: 12/301,224

(22) PCT Filed: May 18, 2007

(86) PCT No.: PCT/JP2007/060240
§ 371 (c)(1), (2), (4) Date: Nov. 17, 2008

(87) PCT Pub. No.: WO2007/135996
PCT Pub. Date: Nov. 29, 2007

(65) Prior Publication Data
US 2009/0226098 A1 Sep. 10, 2009

(30) Foreign Application Priority Data
May 19, 2006 (JP) .................................. 2006-140850

(51) Int. Cl.
*G06K 9/00* (2006.01)
(52) U.S. Cl. ..................................... 382/229; 707/999.1
(58) Field of Classification Search .................. 382/229; 707/999.1
See application file for complete search history.

(56) References Cited

U.S. PATENT DOCUMENTS

| | | | |
|---|---|---|---|
| 4,138,719 A * | 2/1979 | Swanstrom et al. | 358/1.18 |
| 5,369,577 A * | 11/1994 | Kadashevich et al. | 704/9 |
| 6,489,902 B2 * | 12/2002 | Heath | 341/87 |
| 6,678,680 B1 * | 1/2004 | Woo | 1/1 |
| 7,124,034 B2 * | 10/2006 | Shibuya | 702/20 |
| 2004/0047596 A1 * | 3/2004 | Chevallier et al. | 386/68 |
| 2005/0171965 A1 * | 8/2005 | Fujimoto et al. | 707/100 |
| 2005/0187916 A1 * | 8/2005 | Levin et al. | 707/3 |
| 2006/0290535 A1 * | 12/2006 | Thiesson et al. | 341/22 |

(Continued)

FOREIGN PATENT DOCUMENTS

| | | |
|---|---|---|
| JP | 06-083871 | 3/1994 |
| JP | 2005-092707 | 4/2005 |
| WO | WO-2004-034282 | 4/2004 |

\* cited by examiner

*Primary Examiner* — Hadi Akhavannik
(74) *Attorney, Agent, or Firm* — McDermott Will & Emery LLP

(57) ABSTRACT

There is provided a character string updated degree evaluation program that enables quantitative grasping of an amount of intellectual work through editing and updating of character strings. A text subjected to comparison is divided into common part character strings each having a length greater than or equal to a threshold value, and non-common part character strings. A number of edited points from the original text and a context edit distance are calculated based on the rate of the common part character strings and the occurrence pattern thereof. A number of edited point is acquired from a number of elements contained in a common part character string set, and a context edit distance is acquired from a change in an order of occurrence of the common part character strings. Calculation of a new creation percentage and analysis by an N-gram are performed on the non-common part character string. The new creation percentage is acquired from the total length of the elements contained in a non-common part character string set, and a new creation novelty degree is acquired from a non-partial matching rate between a non-common part character string set and an element contained in the non-common part character string set. Calculations for the common part character string set and for the non-common part character string set are united, thereby calculating a text updated degree.

7 Claims, 10 Drawing Sheets

FIG.1

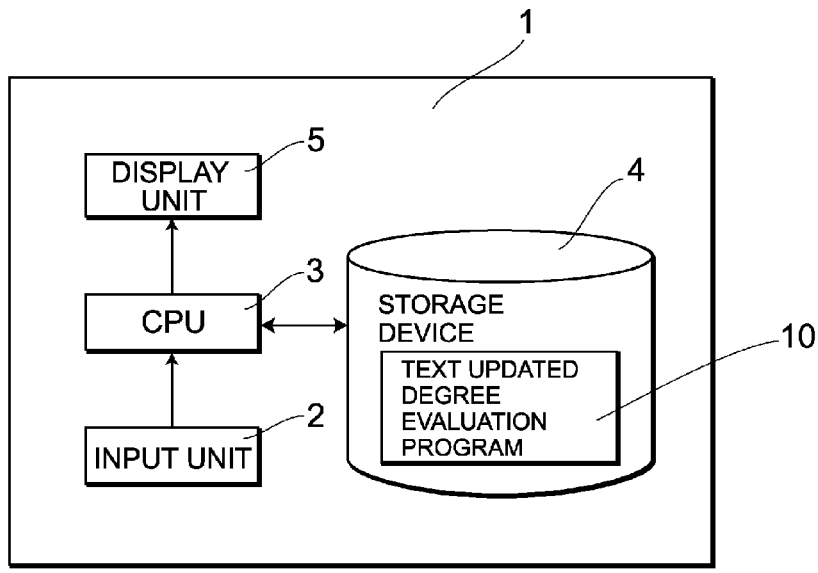

FIG.2

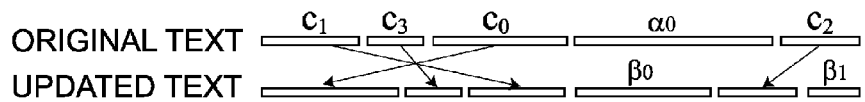

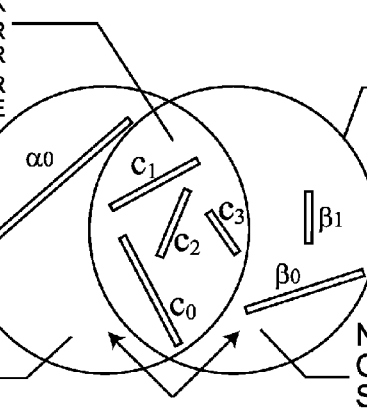

COMMON PART CHARACTER STRING SET C
CONTAINS INFORMATION FOR EVALUATING GENERAL PICTURE OF UPDATING WORK
ELEMENT NUMBER
→ EDITED POINT NUMBER
CHANGE IN OCCURRENCE ORDER
→CONTEXT EDIT DISTANCE

SET OF PARTIAL CHARACTER STRINGS CONSTITUTING UPDATED TEXT

SET OF PARTIAL CHARACTER STRINGS CONSTITUTING ORIGINAL TEXT

NON-COMMON PART CHARACTER STRING SET A
MAINLY CONTAINS DELETED PORTION

NON-PARTIAL MATCHING RATE BETWEEN ELEMENTS
→NEW CREATION NOVELTY DEGREE

NON-COMMON PART CHARACTER STRING SET B
MAINLY CONTAINS NEWLY CREATED PORTION
TOTAL LENGTH OF ELEMENT
→NEW CREATION PERCENTAGE

FIG.11

| | | $c_0$ | $c_1$ | $c_2$ | $c_3$ |
|---|---|---|---|---|---|
| | | 0 | 1 | 2 | 3 | 4 |
| $c_0$ | 1 | | | | |
| $c_1$ | 2 | | | | |
| $c_3$ | 3 | | | | |
| $c_2$ | 4 | | | | |

INITIAL SETTING

| | | $c_0$ | $c_1$ | $c_2$ | $c_3$ |
|---|---|---|---|---|---|
| | | 0 | 1 | 2 | 3 | 4 |
| $c_0$ | 1 | 0 | 1 | 2 | 3 |
| $c_1$ | 2 | 1 | 0 | 1 | 2 |
| $c_3$ | 3 | 2 | 1 | 1 | 1 |
| $c_2$ | 4 | 3 | 2 | 1 | (2) |

EDIT DISTANCE

FIG.12

TEXT x: ABCABC$
TEXT y: BCZZ$

| S[0]: ABCABC$BCZZ$ | SA[0]: $ | H[0]: 1 | G[0]: 1 | |
|---|---|---|---|---|
| S[1]: BCABC$BCZZ$ | SA[1]: $BCZZ$ | H[1]: 0 | G[1]: 0 | |
| S[2]: CABC$BCZZ$ | SA[2]: ABC$BCZZ$ | H[2]: 3 | G[2]: 0 | ADJOINING SA |
| S[3]: ABC$BCZZ$ | SA[3]: ABCABC$BCZZ$ | H[3]: 3 | G[3]: 0 | IS ANOTHER |
| S[4]: BC$BCZZ$ | SA[4]: BC$BCZZ$ | H[4]: 2 | G[4]: 0 | GROUP AND |
| S[5]: C$BCZZ$ | SA[5]: BCABC$BCZZ$ | H[5]: 2 | G[5]: 0 | AT A POSITION |
| S[6]: $BCZZ$ | SA[6]: BCZZ$ | H[6]: 0 | G[6]: 1 | HAVING |
| S[7]: BCZZ$ | SA[7]: C$BCZZ$ | H[7]: 1 | G[7]: 0 | LARGEST HEIGHT |
| S[8]: CZZ$ | SA[8]: CABC$BCZZ$ | H[8]: 1 | G[8]: 0 | |
| S[9]: ZZ$ | SA[9]: CZZ$ | H[9]: 0 | G[9]: 1 | |
| S[10]: Z$ | SA[10]: Z$ | H[10]: 1 | G[10]: 1 | |
| S[11]: $ | SA[11]: ZZ$ | H[11]: 0 | G[11]: 1 | | a) WHEN NO UPDATING b) WHEN PARTIAL DELETION PERFORMED ON x c) WHEN PARTIAL ADDITION PERFORMED ON x d) WHEN PARTIAL INTERCHANGING PERFORMED e) WHEN PARTIALLY MATCH AND THERE IS REPEATING f) COMBINATION OF FOREGOING CASES

FIG.15

|  | REVISION HISTORY 1 | REVISION HISTORY 2 | REVISION HISTORY 3 | REVISION HISTORY 4 | REVISION HISTORY 5 |
|---|---|---|---|---|---|
| REVISION HISTORY 1 | | | | | |
| REVISION HISTORY 2 | | | | | |
| REVISION HISTORY 3 | | | | | |
| REVISION HISTORY 4 | | | | | |
| REVISION HISTORY 5 | | | | | |

THRESHOLD VALUE t = 10, ONE SIDE OF EACH IMAGE CORRESPONDS TO
ONE HUNDRED THOUSAND CHARACTERS (200 CHARACTERS MATCH AT 1 PIXEL)

CHARACTER STRING UPDATED DEGREE EVALUATION PROGRAM

CROSS REFERENCE TO RELATED APPLICATION

This is the U.S. national phase application under 35 U.S.C. §371 of International Patent Application No. PCT/JP2007/060240, filed May 18, 2007 and claims the benefit of Japanese Application No. 2006-140850, filed May 19, 2006. The International Application was published in Japanese on Nov. 29, 2007 as International Publication No. WO 2007/135996 under PCT Article 21(2), and all preceding applications are incorporated herein in their entirety.

DESCRIPTION

1. Technical Field

The present invention relates to a character string updated degree evaluation program which evaluates a degree how much one character string data is updated with respect to another character string date by comparing plural pieces of character string data with each other.

2. Background Art

Measuring the updated degree of a text as character strings becomes necessary in various situations. Examples of such situations are: evaluating the work quantity of a proofreader who corrects a translated text; evaluating the creativeness degree or the imitation degree of a text having a doubt of plagiarism; history management including quantitative evaluation of the updated degree of a text which is continuously updated; restoring the change history between plural texts having unknown version orders; and extracting a new article portion from a web page which is automatically created. What is common to those situations is a problem to quantitatively grasp an intellectual work quantity through editing, updating of a text, and such a work quantity cannot be simply evaluated based on a work time, a change amount in a file size.

Levenstein distance which represents a minimum number of operations to change a text into another text is an index for evaluating the change amount of the text and is simply called "edit distance" in some cases. Levenstein distance is not only used as an evaluation index between plural texts, but is also applied to similarity evaluation between plural DNA arrays in the field of bioinformatics which is being rapidly developed recently. For example, patent literature 1 discloses a technology of determining the similarity between two character strings using Levenstein distance.

Patent Literature 1: Unexamined Japanese Patent Application No. H6-83871

DISCLOSURE OF THE INVENTION

Problem to be Solved by the Invention

For the purpose of evaluating the edited degree and updated degree of a text, the foregoing Levenstein degree has a problem. For example, when Levenstein distance is used, a work of correcting one hundred of one-character spelling misses is evaluated as equal to a work of creating a new text comprising one hundred characters, but it is preferable to distinguish those work from each other because the latter work is an intellectual work. Moreover, it is necessary to separately evaluate an editing work including a change in a context from correction of a single character or a word. In other words, there is a demand for a method of evaluating a human intellectual work like editing and updating of a text as the accumulation of work quantities based on a type of work as much as possible.

The present invention has been made in view of the foregoing problem, and it is an object of the present invention to provide a character string updated degree evaluation program which enables quantitative grasping of an intellectual work quantity in editing and updating of a character string.

Means for Solving the Problem

A character string updated degree evaluation program according to the first aspect of the present invention allows a computer to execute:

an extraction step of extracting common part character strings each having a length greater than or equal to an arbitrary threshold value from original and updated texts subjected to comparison with each other; and a step of subtracting 1 from a number of extracted common part character strings to acquire a number of edited points.

It is focused on that character strings originating from original character strings are divided when editing works, such as newly creation, deletion and substitution are performed, and a number of edited points where editing is performed is acquired while putting portions, on which fine editing works, such as insertion or deletion of a relatively-short character like a single letter or a single word, correction of typo, correction of grammar, and substitution of a word are performed, together.

A character string updated degree evaluation program according to the second aspect of the present invention allows a computer to execute:

an extraction step of extracting common part character strings each comprising successive plural characters and each having a length greater than or equal to an arbitrary threshold value from original and updated texts subjected to comparison with each other;

a step of arranging the common part character strings in an order that the common part character strings occur in the respective texts, to create divided lines; and a step of comparing the divided lines with each other, calculating a minimum number of substitution among the common part character strings necessary to cause one divided line to match another divided line, thereby acquiring a context edit distance.

It is focused on that only substitution work of changing the order of character strings common to original and updated texts is performed in a context editing work, such as recombination of theses across entire character string, or changing an order thereof, and a computation target is limited to a common part character string on which a substitution work is performed, so that only edit distance can be calculated for context editing without focusing on editing works other than context editing, such as newly insertion or deletion of a character.

A character string updated degree evaluation program according to the third aspect of the present invention allows a computer to execute:

an extraction step of extracting a common part character string having a length greater than or equal to an arbitrary threshold value from original and updated texts subjected to comparison with each other; and a step of calculating a rate of a total length of remaining character strings obtained by eliminating the common part character string from the text with respect to a total length of that text, thereby acquiring a new creation percentage.

It becomes possible to evaluate how much newly created characters are created and added with respect to the total length of the updated character strings.

A character string updated degree evaluation program according to the fourth aspect of the present invention allows a computer to execute:

an extraction step of extracting a common part character string having a length greater than or equal to an arbitrary threshold value from original and updated texts subjected to comparison with each other;

a step of collecting remaining character strings obtained by eliminating the common part character string from each text to create a non-common part character string set; and a novelty degree evaluation step of acquiring a new creation novelty degree DO which is a non-matching rate of an N-gram in a length less than the threshold value among non-common part character string sets, wherein the new creation novelty degree DO is expressed by the following equation 1.

$$DO = 1 - |\Gamma_1 \cap \Gamma_2| / |\Gamma_1|$$  [Equation 2]

(Where $\Gamma_1$ and $\Gamma_2$ are N-gram sets each created from a non-common part character string set, $|\Gamma_1 \cap \Gamma_2|$ is a number of common elements commonly occurring in the N-gram sets $\Gamma_1$ and $\Gamma_2$, and $|\Gamma_1|$ is a total number of N-grams contained in the N-gram set $\Gamma_1$).

This enables evaluation of the novelty of a portion added by updating among updated character strings.

According to the character string updated degree evaluation program of the fifth aspect of the present invention, wherein the number of common elements is acquired by:

coupling a first character string and a second character string, corresponding to respective non-common part character string sets created from the original and updated texts, with a terminal symbol;

creating a suffix array for a coupled character string to calculate a height array, and comparing a numerical value of an index of a suffix with a character string length of the first character string which is a front part of the coupled character string, when the suffix array is created;

dividing into a group that a starting part of a suffix begins with the first character string and a group that a starting part of a suffix begins with the second character string; and counting a number of occurrence of a partial character string which matches at the beginning between adjoining suffix arrays, wherein an adjoining suffix array is another group and corresponds to a position having a height greater than or equal to a predetermined value N.

According to this structure, it becomes possible to determine whether a matching pattern is a pattern contained in separate texts or a pattern contained in the same text, and to search a partial character string common in non-common part character string sets with little computation effort.

A character string updated degree evaluation program according to the sixth aspect of the present invention allows a computer to execute a step of calculating a character string updated degree from an evaluation equation: $a \cdot EP + b \cdot CED + NCP \cdot DO \cdot L$ (where EP is a number of edited points, CED is a context edit distance, NCP is a new creation percentage, DO is a new creation novelty degree, L is a total length of an updated text, and a and b are arbitrary coefficients), using a number of edited points, a context edit distance, a new creation percentage, and a new creation novelty degree acquired through the respective steps in the first to fifth aspects of the present invention.

According to this structure, work types, such as (1) insertion or deletion of a relatively-short character like a single character or a single word, correction of typo, correction of grammar, and substitution of a word, (2) recombination of theses across entire character strings, changing an order thereof, and editing of a context, (3) new creation and addition can be evaluated with evaluation items, such as a number of edited points, a context edit distance, a new creation percentage, and a new creation novelty degree, so that intellectual works like editing and updating of a character string can be evaluated as an accumulation of a work quantity based on the work type.

A character string updated degree evaluation program according to the seventh aspect of the present invention allows a computer to execute:

an extraction step of extracting common part character strings each having a length greater than or equal to an arbitrary threshold value from original and updated texts subjected to comparison with each other;

a step of subtracting 1 from a number of extracted common part character strings to acquire a number of edited points; and a step of deciding an update order of each text based on a magnitude relation of a number of edited point.

According to this structure, it becomes possible to evaluate a character string updated degree and to reproduce a revision history by deciding an update order from the number of edited points acquired between plural texts.

A character string updated degree evaluation program according to the eighth aspect of the present invention allows a computer to execute:

an extraction step of extracting common part character strings each having a length greater than or equal to an arbitrary threshold value from original and updated texts subjected to comparison with each other;

a step of arranging the common part character strings in an order that the common part character strings occur in each text, to create divided lines;

a step of comparing the divided lines with each other, calculating a minimum number of substitution among the common part character strings necessary to cause one divided line to match another divided line, thereby acquiring a context edit distance; and a step of deciding an update order of each text based on a magnitude relation of a context edit distance.

According to this structure, it becomes possible to evaluate a character string updated degree and to reproduce a revision history by deciding an update order from the context edit distance acquired between plural texts.

According to the character string updated degree evaluation program of the ninth aspect of the present invention, wherein the extraction step:

couples a first character string and a second character string, corresponding to respective original and updated texts, with a terminal symbol;

creates a suffix array for a coupled character string to calculate a height array, and compares a numerical value of an index of a suffix with a character string length of the first character string which is a front part of the coupled character string, when the suffix array is created;

divides into a group that a starting part of a suffix begins with the first character string and a group that a starting part of a suffix begins with the second character string; and extracts a character string as a longest common part character string which matches at the beginning between adjoining suffix arrays from the text, wherein an adjoining suffix array is another group and corresponds to a position having a highest height; and repeats extracting a longest common part character string from remaining character strings until the length of the longest common part character string becomes less than or equal to the threshold value.

According to this structure, it becomes possible to determine whether a searched longest common part character string is a character string contained in separate texts or a character string contained in the same text, and to search a longest common part character string common in respective texts with a little computation effort.

According to the character string updated degree evaluation program of the tenth aspect of the present invention, wherein the extraction step replaces a common part character string with another special character when extracting the common part character string.

This makes it possible to suppress any accidental occurrence of a common part character string having a length greater than or equal to a predetermined length in remaining character strings acquired after a common part character string is extracted.

According to the character string updated degree evaluation program of the eleventh aspect of the present invention, wherein the extraction step extracts a character string from the text as a common part character string corresponding to a portion where an offset of a dot plotted on a dot matrix, created by comparing the texts with each other, from the center of the dot matrix successively appears as a constant value over predetermined number of times greater than or equal to the threshold value.

This enables searching of a common part character string using a dot matrix.

A character string updated degree evaluation program according to the twelfth aspect of the present invention allows a computer to execute:

an extraction step of extracting common part character strings each having a length greater than or equal to an arbitrary threshold value from original and updated texts subjected to comparison with each other;

arranging the common part character strings in an order that the common part character strings occur in each text where extraction is performed, to create divided lines;

and a step of comparing the divided lines with each other created from each text, plotting each character, constituting a common part character string in matching per common part character string unit contained in each divided line, as a dot, thereby creating a dot matrix, and displaying the dot matrix.

According to this structure, in evaluating a character string updated degree, by creating a dot matrix having a dot element which is not each character constituting a character string but is a common part character string, only the degree of change in character string pattern due to an editing work performed on a character string common in original and updated texts is plotted as a dot, so that the tendency of the editing work through entire character strings can be visually displayed.

EFFECTS OF THE INVENTION

According to the first aspect of the present invention, it is expected for the evaluation of the general picture of a character string updated degree that an evaluation similar to the feeling of a human who sees character strings after updating like "roughly how many portions are edited" can be achieved.

According to the second aspect of the present invention, it becomes possible to evaluate a character string updated degree from the standpoint of context editing.

According to the third aspect of the present invention, it becomes possible to evaluate a character string updated degree from the standpoint of new creation.

According to the fourth aspect of the present invention, it becomes possible to evaluate a character string updated degree from the standpoint of the novelty of a newly created portion with respect to a text prior to updating.

According to the fifth aspect of the present invention, it becomes possible to reduce the computation effort when a number of common elements in N-gram sets is calculated, and to improve the feasibility and the execution speed in running the character string updated degree evaluation program on a computer.

According to the sixth aspect of the present invention, the quantities of all types of intellectual works through editing and updating of a character string can be quantitatively grasped.

According to the seventh aspect of the present invention, it becomes possible to select a text of a desired version from plural texts.

According to the eighth aspect of the present invention, it becomes possible to select a text of a desired version from plural texts.

According to the ninth aspect of the present invention, it becomes possible to reduce the computation effort when a character string is checked between texts, and to improve the feasibility and the execution speed in running the character string updated degree evaluation program on a computer.

According to the tenth aspect of the present invention, it becomes possible to extract a common part character string more precisely.

According to the eleventh aspect of the present invention, it becomes possible to easily search a common part character string.

According to the twelfth aspect of the present invention, a character string updated degree can be visually grasped.

BRIEF DESCRIPTION OF DRAWING

FIG. 1 is a block diagram showing the general structure of a computer in which a text updated degree evaluation program of the present invention is installed;

FIG. 2 is an explanatory diagram showing a relationship between each partial character string set and an evaluation item;

FIG. 11 is an explanatory diagram showing a calculation example for an edit distance;

FIG. 12 is an explanatory diagram showing a calculation example for a common part character string;

FIG. 15 is an explanatory diagram showing a list of dot matrixes of "wordsmith by the same writer";

BEST MODE FOR CARRYING OUT THE INVENTION

Figure 3:
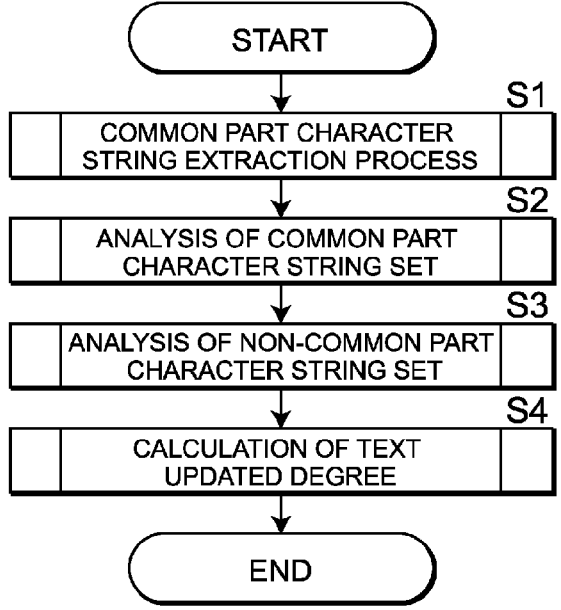
FIG. 3 is a flowchart showing the general flow of a text updated degree evaluation process executed by the character string updated degree evaluation program of the present invention.

A preferred embodiment of a text updated degree evaluation program according to the present invention will be explained with reference to accompanying drawings.

FIG. 1 shows the general structure of a computer in which a text updated degree evaluation program, as a character string updated degree evaluation program of the present invention, is installed. In the figure, a computer 1 has general hardware structures, i.e., has at least an inputting unit 2 like a pointing device or a keyboard, a CPU 3 which is a central processing unit, a storage device 4 like a hard disk, and a display unit 5 like a display device. The CPU 3 organically combines those hardware structures together, and executes successive information processing through a text updated degree evaluation algorithm implemented by the text updated degree evaluation program 10. A text updated degree evaluation program 10 is stored in the storage device 4 together with other data, and the CPU 3 arbitrarily executes the processes of the text updated degree evaluation program 10 in accordance with an operational inputting through the inputting unit 2, and displays a process result on the display unit 5. Note that an example case where the text updated degree evaluation program is installed in the computer 1 is shown in the figure, but only the process result of the text updated degree evaluation program 10 may be provided to the computer 1, which serves as a client, through a network like the Internet from a server, such as a Web server or an ASP server.

Next, an explanation will be given of a text updated degree evaluation algorithm implemented by the text updated degree evaluation program 10.

According to the text updated degree evaluation algorithm, based on new evaluation models in harmony with an actual text editing work by a human, partial character strings generated through character string matching are analyzed multi-step, thereby carrying out comprehensive evaluation. To establish a model for evaluating the text updated degree, an actual text editing work by a human is taken into consideration as a model for evaluating the updated degree between two given texts, and according to the text updated degree evaluation algorithm, evaluation is carried out through three items: (1) insertion and deletion of a relatively-short letter, such as a single character or a single word, correction of typo, correction of grammar, and substitution of a word; (2) recombination of theses across entire text, order change thereof, context editing; and (3) new creation, and addition, thereby evaluating a conclusive text updated degree. In order to evaluate such editing works, it is essential to find out a common part, which is not edited, in a text.

An evaluation item which corresponds to item (1) relatively-short substitution, deletion, and insertion of the foregoing evaluation model is a "number of edited points". The "number of edited points" represents the number of edited points which are portions having undergone editing, and is decided based on the number of elements of a common part character string set. As an editing work, such as new creation, deletion, or substitution is performed, character strings originating from an original text are divided, so that the number of edited points increases. Because of the work of a threshold value t to be discussed later, with respect to successively carried out editing works, edited points are collected at one portion by a non-common part character string, so that it can be expected that an evaluation, which is similar to a feeling of a human when he/she sees a text having undergone editing like "roughly how many portions in the text are edited", is acquired.

An evaluation item corresponding to item (2) context editing of the foregoing evaluation model is a "context edit distance". The "context edit distance" is an evaluation item which indicates the degree how much a context is edited, such as recombination of theses across entire text, and changing an order thereof. A sequence holding the occurrence order of each common part character string obtained by dividing each of original and updated texts by an edited point is called divided line, and an edit distance between divided lines is a context edit distance.

Evaluation items corresponding to item (3) new creation of the foregoing evaluation model are a "new creation percentage" and a "new creation novelty degree". A new creation percentage" indicates a ratio of the total length of non-common part character strings with respect to the total length of the updated text, and a "new creation novelty degree" is a non-match rate of N-grams having a length N (0<N<t, where t is an arbitrarily threshold value) included in between non-common part character string sets, and indicates the novelty of a portion added by updating.

The calculation methods of those evaluation items "edited point number", "context edit distance", "new creation percentage" and "new creation novelty degree" will be explained in detail later, but by applying those evaluation items to texts (character string data) to be compared with each other, a text updated degree which quantitatively indicates a quantity of intellectual work through editing and updating of a text as character strings can be acquired.

FIG. 2 is a conceptual diagram showing a relationship between each partial character string set and an evaluation item. The calculation method of a text updated degree as a character string updated degree will now be schematically explained with reference to FIG. 2. Note that in the figure, character strings which present between comparison-target texts and match with a length greater than or equal to the threshold value t are denoted by a letter c, a remaining character string, which is acquired from the original text among remaining character strings obtained by eliminating the common part character strings from the comparison-target targets is denoted by a letter α, and one created from the updated text is denoted by a letter β.

As a calculation method of a text updated degree, there is proposed a combination of an evaluation of the transition state of a common part character string which presents between the comparison-target texts, and an evaluation using an N-gram model which manages the frequency of occurrence of N characters successive in a non-common part character string. The definitions of a common part character string and a non-common part character string will be discussed later. In calculating a text updated degree, first, the comparison-target texts are divided into common part character strings c0, c1, c2, and c3 which completely match with a length greater than or equal to the threshold value t, and non-common part character strings $\alpha 0$, $\beta 0$, and $\beta 1$ other than the common part character strings. This operation is equivalent to breaking down the comparison-target texts into partial character strings by "edited points" where some kind of text changing is performed and further dividing those partial character strings into the common part character strings c0, c1, c2, and c3 which are common before and after the editing, a deleted character string $\alpha 0$, and newly created character strings $\beta 0$ and $\beta 1$.

Next, a number of edited points and a context edit distance from the original text are calculated based on the ratio of the acquired common part character strings c0, c1, c2, and c3 and the occurrence patterns thereof. Based on the calculation results, the general picture of an updating work is evaluated. The number of edit points is determined from the number of elements contained in a common part character string set C, and the context edit distance is determined based on the change in the occurrence order of the common part character strings c0, c1, c2, and c3. On the other hand, calculation of a new creation percentage and analysis by an N-gram are performed on the non-common part character strings $\alpha 0$, $\beta 0$, and $\beta 1$. Accordingly, a new creation novelty degree which indicates the quality of an updating work at a substantially newly created portion in the text having undergone editing is evaluated. The new creation percentage is determined from the total length (total character number) of elements contained in a non-common part character string set B, and a new creation novelty degree is determined from the non-partial matching rate of elements contained in a non-common part character string set A and a non-common part character string set B. Thereafter, calculation results for the common part character string set C and for the non-common part character string sets A, B are collected together, and a comprehensive evaluation as a text updated degree is calculated.

FIGS. 3 to 6 are flowcharts showing the successive flows of a text updated degree evaluation process executed by the text updated degree evaluation algorithm. As shown in FIG. 3 which shows the general flow of the text updated degree evaluation process as a character string updated degree evaluation process, an extraction process of a common part character string between comparison-target texts is performed (step S1) as explained above, an extracted common part character string set is analyzed to evaluate a number of edited points and a context edit distance (step S2), a non-common part character string set obtained by extracting the common part character string set is analyzed to evaluate a new creation percentage and a new creation novelty degree (step S3), and a text updated degree is calculated from the acquired number of edited points, context edit distance, new creation percentage, and new creation novelty degree (step S4).

Figure 4:
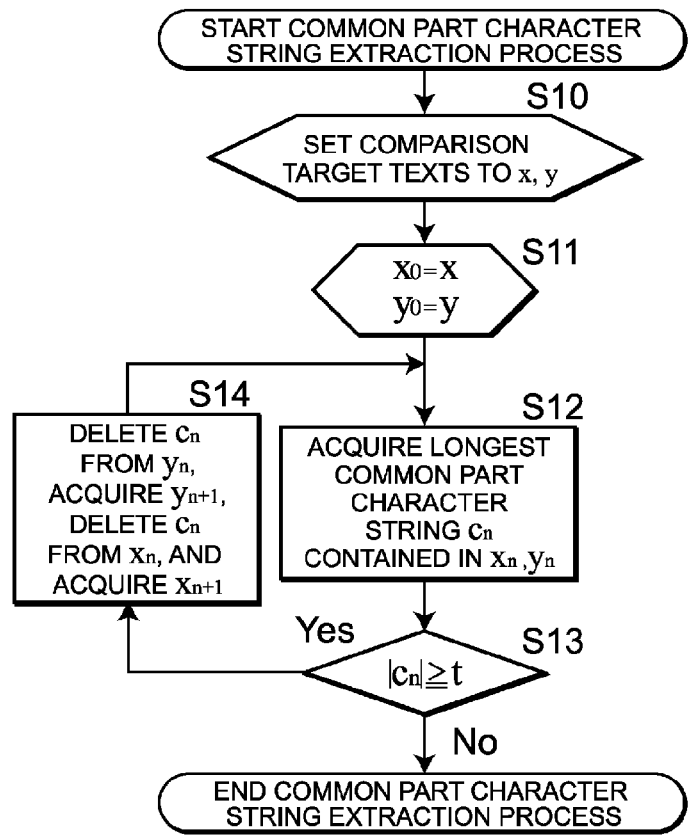
FIG. 4 is a flowchart showing the flow of a common part character string extraction process which is a part of the text updated degree evaluation process.
Figure 5:
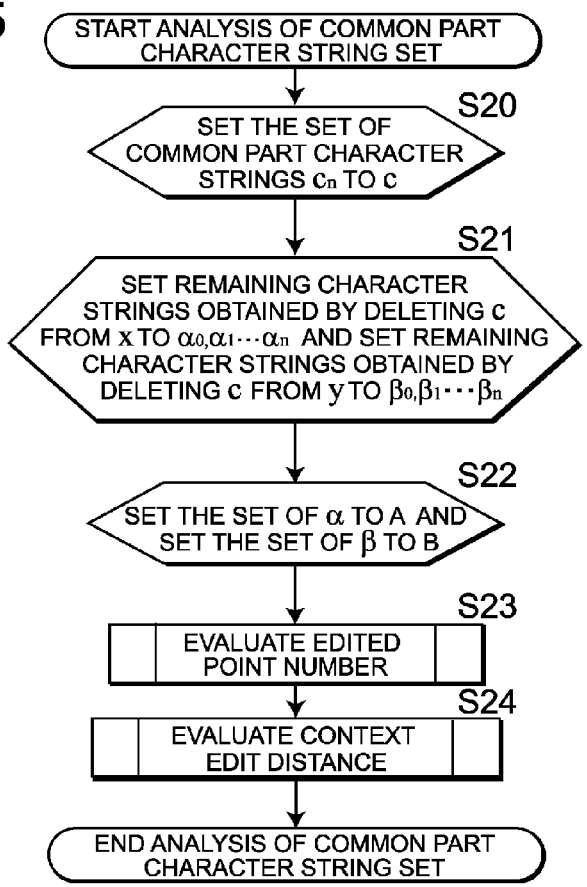
FIG. 5 is a flowchart showing the flow of an analysis process of a common part character string set which is a part of the text updated degree evaluation process.

In regard to creation methods of a common part character string set and a non-common part character string set successively executed through the step S1 and the step S2, an explanation will be given in detail with reference to FIG. 4 and FIG. 5. In the common part character string extraction process in the step S1, a longest common part character string (hereinafter, LCS) having the longest length in partial character strings common in the comparison-target texts is searched, another LCS is searched from remaining character strings in a text where the acquired LCS is eliminated, and this routine is repeated until the length of an LCS becomes less than or equal to the threshold value t, thereby acquiring a common part character string set. Note that the threshold value t is for determining whether or not a character string is a "common character string" when greater than or equal to some numbers of letters match, and is a positive integer. First, comparison-target texts are set to be x, y, respectively, and the comparison-target texts x, y are given to x0, y0 as initial values (steps S10, S11). Next, a common longest common part character string c0 is acquired, and if |c0| which represents the number of characters in the longest common part character string is greater than or equal to t, c0 is eliminated from x0, y0, and character strings remained after elimination are set to be x1, y1 (steps S12 to S14). At this time, when c0 occurs in x0, y0 in plural times, searching is started from the beginning of a text and a partial character string matched at first is eliminated. The routine is repeated and cn, xn, and yn are acquired until |cn| becomes less than the threshold value t.

Subsequently, in the analysis of the common part character string set at the step S2, the set of partial character strings {c0, c1, c2, . . . , cn} acquired in the step S1 are defined as a common part character string set C between x and y (step S20). Remaining texts obtained by eliminating all common part character strings cn having a length greater than or equal to the threshold t from the texts x, y comprise large number of character string pieces, the remaining texts of x are represented as {$\alpha 0$, $\alpha 1$, . . . , $\alpha n$}, and remaining texts of y are represented as {$\beta 0$, $\beta 1$, . . . , $\beta m$} (step S21). Because there is no common character string having a length greater than or equal to the threshold value t between elements of both sets {$\alpha n$} and {$\beta m$}, they are called non-common part character string sets between the texts x and y, and denoted by letters A, B, respectively (step S22). Therefore, sets of common part character strings and non-common part character strings C, A and B between the texts x and y are acquired.

Figure 7:
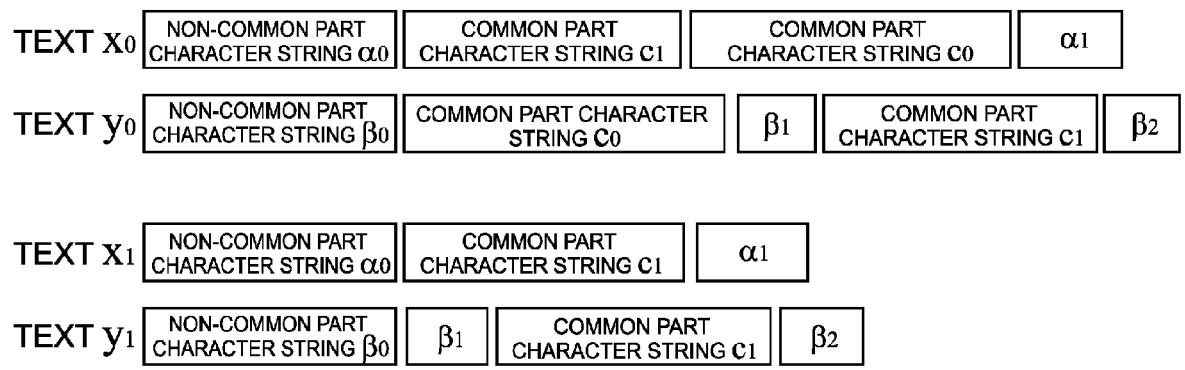
FIG. 7 is an explanatory diagram showing examples of creating texts x1, y1 when there are two common character strings.
Figure 8:
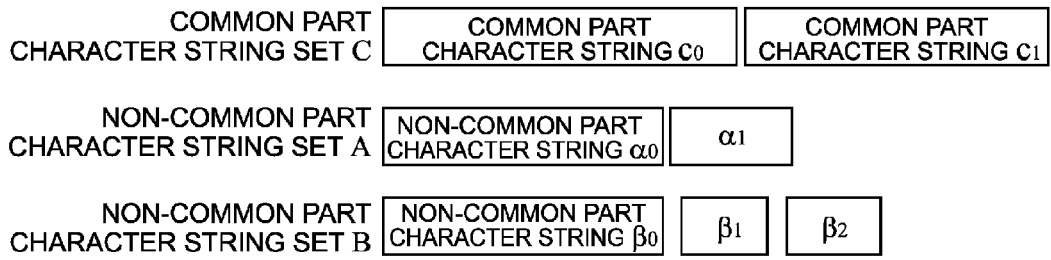
FIG. 8 is an explanatory diagram showing examples of sets C, A and B created under the condition shown in FIG. 7.

FIG. 7 shows an example of creating x1, y1 when there are two common part character strings. FIG. 8 shows sets C, A and B created based on the creation example in FIG. 7. In both figures, common part character strings and non-common part character strings are separated beforehand to facilitate understanding, but in practice, it should be noted that a non-common part character string is defined after all common part character strings which satisfy the threshold value t are extracted. Various dividing methods can be employed to divide the texts x, y into partial character strings, but partial character string sets when the texts are divided into the elements of common part character string set C, and non-common part character string sets A, B acquired through the foregoing fashion are denoted by letters X, Y. At this time, X and Y can be represented as X=C∪A, and Y=C∪B. The text x comprises combinations of all elements of the partial character string set X, and the text y comprises combination of all elements of the partial character string set Y. x and y in FIG. 8 can be represented as x=$\alpha 0 c 1 c 0 \alpha 1$, y=$\alpha 0 c 0 \beta 1 c 1 \beta 2$, using $\alpha$, $\beta$, and c. At this time, $\alpha$ and $\beta$ occur in the suffix order, but it should be noted that it is not always true that cn occurs in the suffix order.

An explanation will be given of evaluation of a number of edited points executed at step S23. An edited point is a portion having undergone editing. Here, text updating is evaluated based on a common part character string, it is treated that a portion other than a common part character string is subjected to any kind of editing work. Accordingly, the total number of edited points is decided based on the number of elements |C| of a common part character string set, and when an edited point number is written as EP, then it is possible to express that EP=|C|−1. When the same texts are compared with each other, the element number |C| of a common part character string set is 1, so that EP=1−1=0. When an editing work, such as new creation, deletion, or substitution is carried out, character strings are divided from an original text, and the number of common part character strings increases, resulting in increment of the number of edited points. With respect to editing works successively carried out at an interval less than or equal to t due to the threshold value t, it is processed beforehand as one common part character string because of the work of the threshold value t, so that it can be expected that edited points have an evaluation similar to a feeling of a human seeing an edited text like "roughly how many portions in a text are edited".

Figure 9:
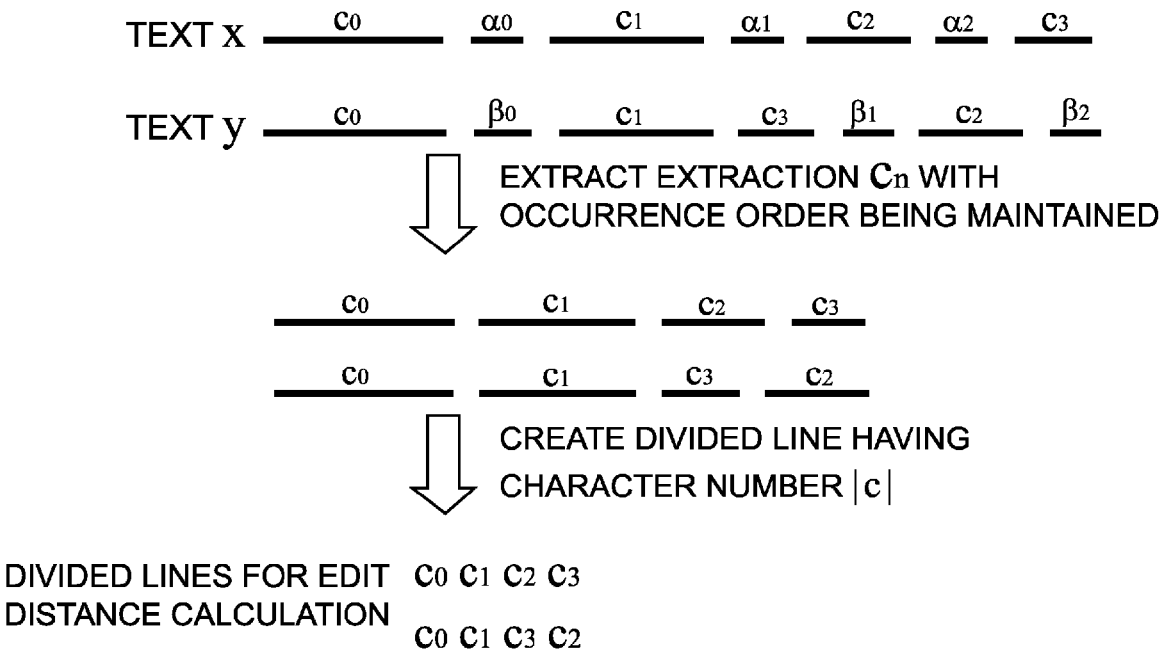
FIG. 9 is an explanatory diagram showing an example of creating a divisional string.

An explanation will be given of evaluation of a context edit distance executed at step S24 in FIG. 5. A context edit distance is an item which indicates a degree how much a context is edited, such as recombination of theses across entire text, changing an order thereof, and is hereinafter expressed as CED. In calculating a context edit distance, first, common part character strings contained in the texts x, y are picked up from the beginning of the texts in the occurrence order thereof, and seriated in such an order. The sequence of partial character strings maintaining the occurrence order created in this fashion is called divided line. FIG. 9 shows an example of creating divided lines. In the figure, common part character strings cn are extracted from the texts x, y with the occurrence order thereof being maintained, and by creating divided lines having a number of letters |C|, a divided line c0c1c2c3 and a divided line c0c1c3c2 are created to calculate an edit distance. For the two divided lines created at this stage, an edit distance (Levenstein distance) is calculated. An edit distance indicates a minimum number of operations for performing insertion, deletion, and substitution on a character string to cause the character string to match another character string.

Figure 10:
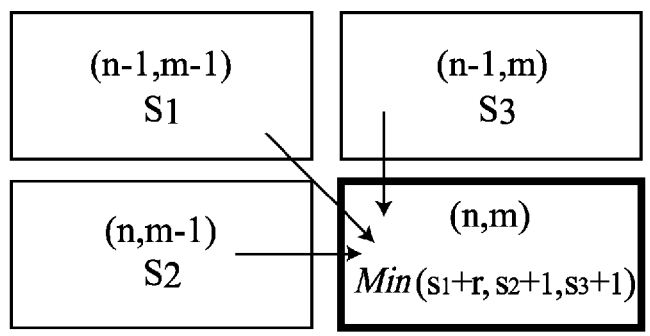
FIG. 10 is an explanatory diagram showing a calculation method of an edit distance.

FIG. 10 shows a calculation method of an edit distance, and FIG. 11 shows a calculation example of an edit distance. In FIG. 10, when n-th character and m-th character in the comparison-target texts match, it is set that r=0, and r=1 for other cases. One which has a minimum cost in regard to displacement from three points is acquired, and the foregoing routine is repeated, thereby determining an edit distance between two divided lines. Note that S1, S2 and S3 are costs owned by individual array elements. According to the text updated degree evaluation algorithm, calculation of an edit distance is performed on a common part character string, and an editing work which must be taken into account for an evaluation is merely a context editing, i.e., substitution of a divided line, and a cost of substitution is calculated as 1. Specifically, as shown in FIG. 11, an array M having a row, which has a size of a number of elements contained in a divided line c0c1c2c3 of an original text+1=5, and a column, which has a size of a number of elements contained in a divided line c0c1c3c2 in a text having undergone editing+1=5, is prepared, the value of an array element M[0, 0] of the array M is set to 0, for an array element M[0, m] (where 0<m<4) in 0th row, values which are equal to values where a cost of substitution 1 is added to M[0, m−1] are set respectively, and for an array element M[n, 0] (where 0<n<4), a value which is equal to a value where a cost of substitution 1 is added to M[n−1, 0] is set, so that the array M becomes in an initial setting shown in FIG. 11. It is determined whether or not the n-th common part character string in the divided line c0c1c3c2 corresponding to a text having undergone editing is equal to the m-th common part character string of the divided line c0c1c2c3 corresponding to the original text, a minimum value among a value where r is added to the value S1 of an array element M[n−1, m−1], a value where a cost of substitution 1 is added to the value S2 of an array element M[n, m−1], and a value where a cost of substitution 1 is added to the value S3 of an array element M[n−1, m], and is stored in an array element M[n, m]. FIG. 11 shows the array M after values of array elements are acquired in this fashion, and an edit distance in this case is 2.

In general, when a character string is edited, new insertion of a character or deletion of a character are performed, and there is a problem that an edit distance becomes large as a difference in a number of characters from an original text becomes large, regardless of the complexity of an editing work, but according to the text updated degree evaluation algorithm, a calculation target is limited to a common part character string, and calculation of an edit distance becomes possible at the same number of characters. This is because an edit distance between character strings having the same alphabet set and having the same number of characters is calculated, and an acquired score can be taken as one which represents a minimum number of substitution between common part character strings. This value means a number of changing an occurrence order between divided lines, and represents a degree of context editing. Thus, a context edit distance reflects a number of changing an occurrence order of common part character strings. Accordingly, even if the number of edited points increases due to addition, deletion of a text, the value of a context edit distance is not affected unless a change occurs in an occurrence order of a common part character string.

Figure 6:
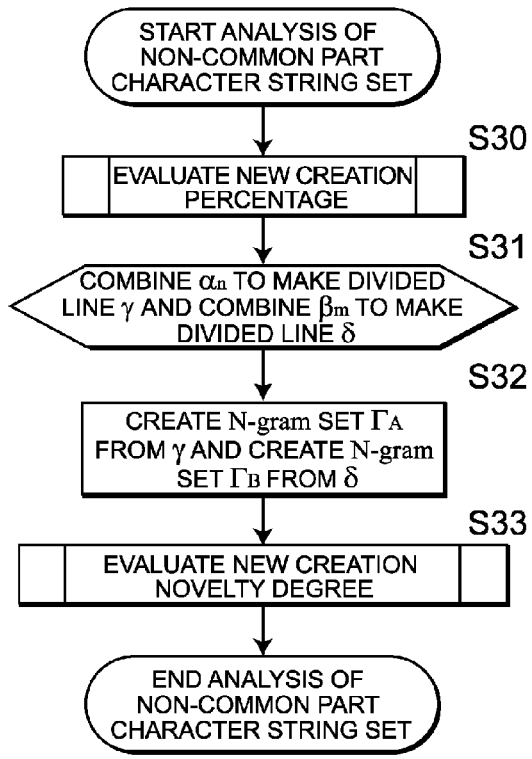
FIG. 6 is a flowchart showing the flow of an analysis process of a non-common part character string set which is a part of the text updated degree evaluation process.

Return to FIG. 3, in analysis of a non-common part character string set at the step S3, evaluation of a new creation degree and evaluation of a novelty are performed on non-common part character string sets A, B. FIG. 6 shows the flow of this analysis process in detail. In the analysis process, a new creation percentage is evaluated right after the beginning (step S30). A new creation percentage is a rate of the length of a non-common part character string with respect to the total text length, and a new creation percentage NCPy with reference to the text y can be given by the following equation 3.

$$NCP_y = \Sigma |\alpha_n|/|x|$$ [Equation 3]

Then, a new creation percentage NCPx with reference to the text x can be given by the following equation 4.

$$NCP_x = \Sigma |\beta_n|/|y|$$ [Equation 4]

The maximum value of this value is 1, and it represents that a rate of newly created part is high in a text as it becomes close to 1.

A new creation novelty degree is a non-matching rate of an N-gram having a length less than t between non-common part character string sets, and indicates the novelty of a part added by updating. Let us suppose that an N-gram set having a length N and created from a character string having a length L is Γ. Then, the total number of N-gram can be decided from an equation |Γ|=L−N+1. In an analysis using an N-gram in a non-common part character string, first, αn and βm in the non-common part character strings A, B are connected together with a sequence order thereof being maintained, and are taken as divided lines γ, δ, respectively (step S31). Next, to check a matching having a length less than the threshold value t with respect to γ, δ, N-gram sets ΓA, ΓB are created with in a range 0<N<t (step S32). In regard to a matching having a length greater than or equal to the threshold value t, character strings are sorted into a common part character string set, and is not to subjected to the process here. Elements commonly occur for the N-gram sets ΓA, ΓB created from γ, δ in this fashion are acquired, and a rate where a matching rate with respect to the number of elements of A, B is eliminated is calculated (step S33). Equation 5 represents a new creation novelty degree DOy in consideration of the text y.

$$DO_y = 1 - |\Gamma_A \cap \Gamma_B|/|\Gamma_A| \quad \text{[Equation 5]}$$

Equation 6 represents a new creation novelty degree DOx in consideration of the text x.

$$DO_x = 1 - |\Gamma_A \cap \Gamma_B|/|\Gamma_A| \quad \text{[Equation 6]}$$

Those values are rates that partial matching between non-common character string sets A, B is eliminated, and each becomes a smaller value if there are as many as expressional diversion between A and B. Note that a number of respective elements of ΓA, ΓB can be expressed by equations |ΓA|=|A|−N+1, and |ΓB|=|B|−N+1.

In the step S3 shown in FIG. 3, evaluation results for the common part character string set C and the non-common part character string sets A, B acquired at the steps S2, S3 are collected together, and a text updated degree is calculated. The evaluation equation for a text updated degree can be expressed as a·EP+b·CED+NCP·DO·L, where EP is an edited point number, CED is a context edit distance, NCP is a new creation percentage, DO is a new creation novelty degree, and L is a text length after updating, and coefficients a, b, of individual items are coefficients set arbitrarily to do weighting and evaluate an editing work evaluated by individual evaluation items, and each evaluation value is converted into a number of characters which can be quantitatively grasped in accordance with a number of characters in a newly created part.

The above-explained successive processes can be done at a short time by simply causing a computer to calculate in a round-robin manner if a text is a short text containing one hundred and two characters or so. However, in order to practically run the text updated degree evaluation program on a computer as an application program, it is necessary to execute character string comparison between texts containing one hundred and three to one hundred and five characters or so, and it requires a scheme which reduces a computation effort from the standpoint of the feasibility and the execution speed. As an example of such scheme, an explanation will be given of a method of searching a common part character string using a suffix array and a method of calculating an N-gram.

There are various methods for searching a common part character string between texts, in general, searching a longest matching portion therebetween, but here, searching which utilizes a data structure called suffix array that collects suffix trees compactly is used. It is needless to say that this method can search a common part character string, and there is an advantage that a program can be simplified because calculation is carried out by utilizing a data structure of the same suffix array in generating an N-gram which is used for analyzing a non-common part character string. General suffix arrays are used to check matching of a partial character string in the same text, but searching of a common part character string necessary for the calculation by the text updated degree evaluation algorithm is searching of a partial character string which matches with the longest length between two texts. Therefore, a data structure called generalized suffix tree in which suffix trees correspond to plural character strings is used to acquire a common part character string. According to this method, a suffix array is generated for character strings coupled together with a terminal symbol $, and height array calculation is executed, but it is necessary to determine whether a matching pattern is a pattern contained in separate texts or contained in the same text.

In the embodiment, a text group array G is created as an additional data structure to check a text presenting at a starting position from a suffix. FIG. 12 shows a calculation example of a common part character string. The calculation method will be explained with reference to FIG. 12. All suffixes from character strings that connects a text x and a text y are created, stored in an array S, suffixes are sorted, and a suffix array SA which stores an index corresponding to a position of a suffix before sorting is created. Note that "$" added to the last of a character string is a terminal symbol, and indicates that this is the end of a text. A length that a character string corresponding to a suffix array SA with the same index and a character string corresponding to a suffix of next index matches at the beginning is stored in an height array H. If a portion where the value of the height array becomes largest is checked, it is possible to check the longest common part character string in a text. In creating a suffix array, the value of an index of a suffix and a character string length of a text coupled at first, i.e., text x, are compared with each other, and an array G is created in such a way that one having a starting part of a suffix beginning with the text x (value of index of suffix <character string length of text x=7) is sorted as text group 0, and one beginning with y (value of index of suffix ≧ character string length of text x=7) is sorted as text group 1. Adjoining SA is another text group and corresponds to the longest matching portion for determining a position having the largest height.

In searching a common part character string using a generalized suffix tree, it is easy to search the longest common part character string presenting in between texts, but for second and later common part character strings which are necessary for the text updated degree evaluation algorithm, it is necessary to do searching while taking in the presence of a common part character string already acquired. As an example, let us now suppose a case where texts x0: ABCXXXXDE$ and y0: ABCDEXXXX$. In this case, the longest common part character string c0 contained in both texts is "XXXX", but if x1, y1 are created by simply deleting that common part character string, text x1 becomes ABCDE$ and text y1 becomes ABCDE$. Even though original text x0 does not contain a partial character string of "ABCDE$", there is created a common part character string having a length longer than that of c0 between text x1 and text y1. In order to avoid this problem, in calculating second or later common part character strings, it is necessary to take into account that there is a gap indicating already subjected to acquisition (already subjected to deletion) between "C" and "D". Specifically, it is fine to replace a common part character string already calculated and presenting in each text with another special character.

In regard to calculation of an N-gram, if a suffix array and a height array have been already calculated, with reference to the value of a height array of a suffix having a length greater than or equal to N, a number how many times a partial character string having a length 3 occurs is successively counted up. Note that, unlike a case where a suffix array is used for calculating a common part character string set, an N-gram used for an analysis of a non-common part character string set can be reused once created.

Figure 13:
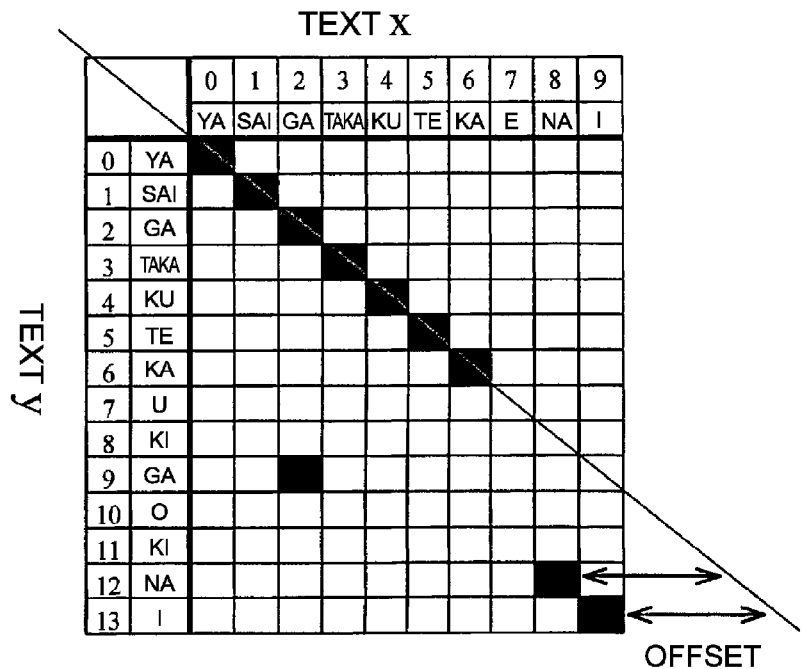
FIG. 13 is an explanatory diagram showing a calculation example for a dot matrix.
Figure 14:
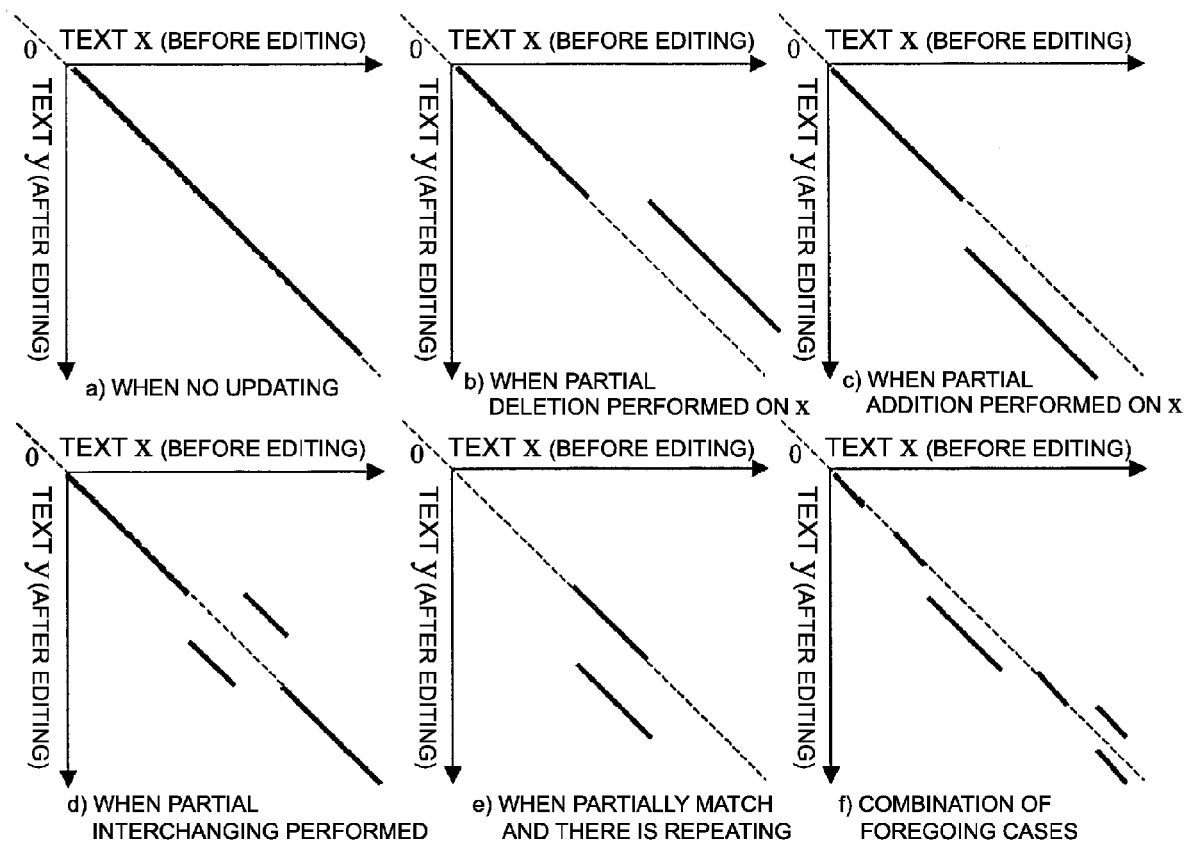
FIG. 14 is an explanatory diagram showing a typical example of text updating seen in a dot matrix.

In the meanwhile, in evaluating a text updated degree, a dot matrix is used as a tool to visually confirm what difference and what change are present between comparison-target texts. A dot matrix is a graph in which portions having a high similarity among arrays can be easily visualized as successive diagonal components, and this is displayed on the display unit 5. Note that the explanation has been given of the method of searching a common part character string using a suffix array in the embodiment, but the same calculation can be carried out using a dot matrix. FIG. 13 shows a calculation example by a dot matrix. Like a typical example shown in FIG. 14, a dot matrix has an advantageous for viewing the occurrence tendency of a common part character string. In particular, it is advantageous that the value of an offset which is a difference between a coordinate position of a dot over the horizontal axis and a coordinate position thereof over the vertical axis can be easily confirmed. In the first place, calculation of an offset employs a method for determining that a portion where an offset is successive from the center of the dot matrix and occurs as a constant value is a common part character string, this value can be observed as a displacement distance of a common part character string between texts. That is, the value of an offset can be treated as a displacement amount of a common part character string over the dot matrix, i.e., a result representing the degree of a change in a text by editing. Everything is displayed as a dot according to an original dot matrix upon matching per one character, but it should be noted that a common part character string is plotted as a dot. In other words, everything appeared on the dot matrix as a point, a line, and the like is a common part character string, and a matching with a length less than the threshold value t is not displayed.

Figure 16:
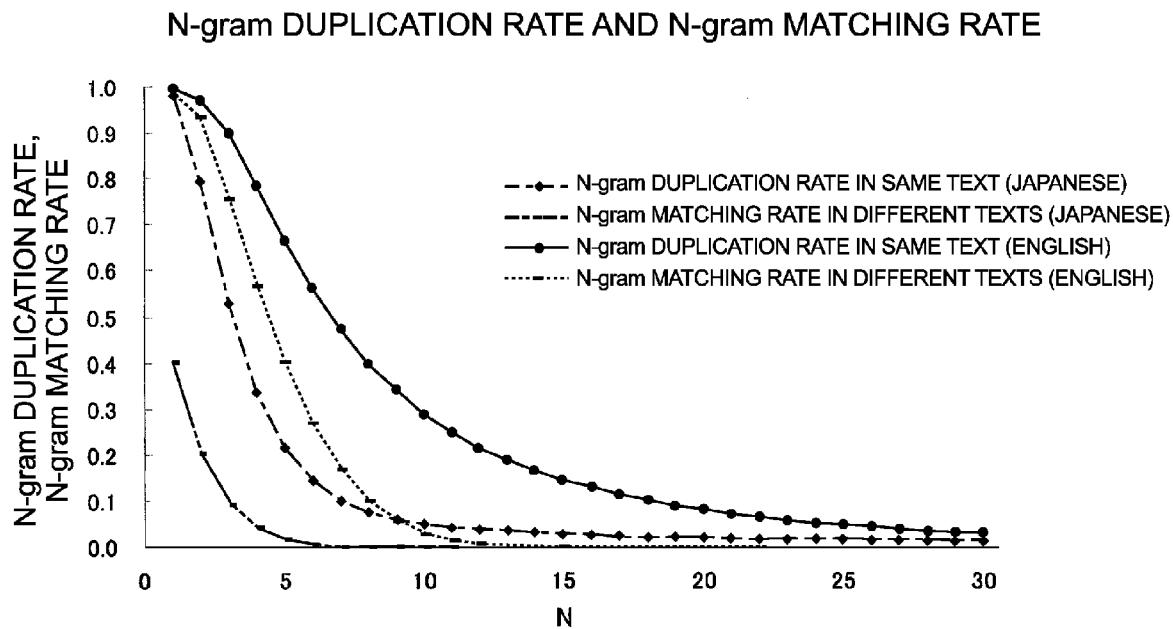
FIG. 16 is a graph showing an N-gram duplication rate and an N-gram matching rate by texts in the same language having different subject matter.
Figure 17:
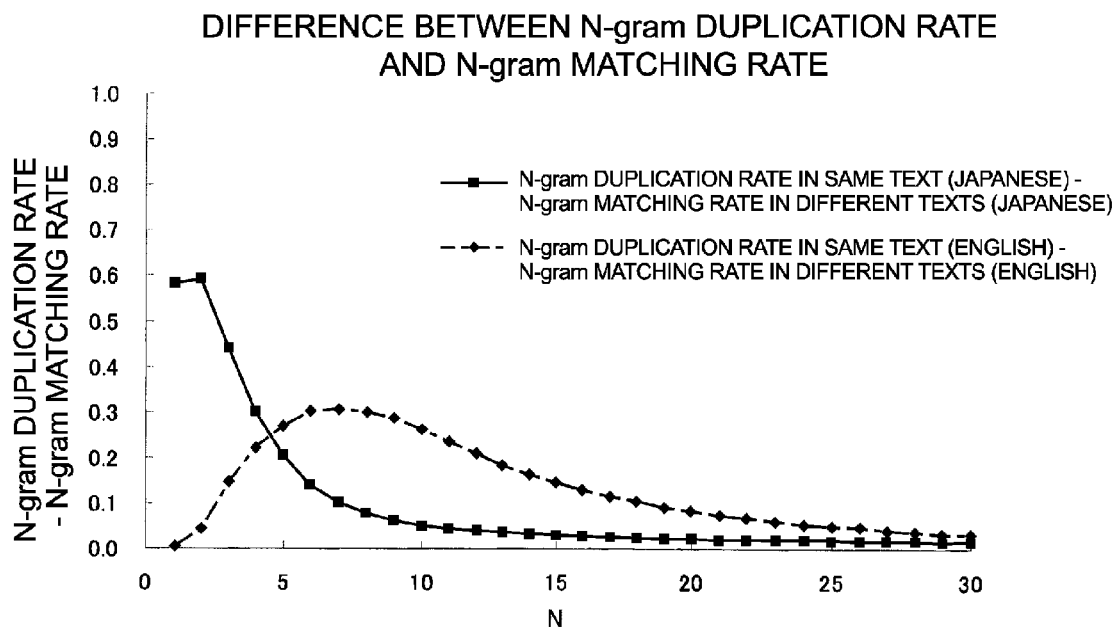
FIG. 17 is a graph showing a difference between an N-gram duplication rate and an N-gram matching rate by texts in the same language having different subject matter.

FIG. 15 shows a result of a wordsmith by the same writer, and a list of display results by the dot matrix with respect to revision histories 1 to 5 successively revised. It becomes apparent from the figure that a new creation percentage is low across all texts, and lots of texts prior to updating are used. In viewing a change in the dot matrix, it becomes clear that updating is carried out along a time series from "revision history 1" to "revision history 5". Furthermore, it can be confirmed that there is only few updating between "revision history 3" and "revision history 4". Table 1 shows a list of text updated degree evaluation results of revision histories 1 to 5.

short character strings contain frequent idiom and expression as long as the texts are written in the same language, but such matching is not observed in a length greater than or equal to a predetermined length. In a graph shown in FIG. 16, matching between different texts is not observed if the length exceeds 1 in Japanese and 22 in English. However, a common part character string between updated texts usually has a length greater than those lengths, and matching occurs at several ten to several tens of thousands of length in an analyzed text used this time. Accordingly, as a determination threshold value of a common part character string, t=25 where it is thought that no accidental matching in the same language occurs is set as an optimized threshold value. This is a length corresponding to English having an alphabet set roughly considered as a minimum set through all language, and this also corresponds to Japanese. In regard to optimization of N used for calculating a new creation novelty degree, the same is true of the threshold value t, and if the length is short, duplication of expressions inherent to a language occurs, and if too long, no matching is observed. Therefore, a difference between an N-gram duplication rate and an N-gram matching rate is acquired, and the value of N which enables searching of duplicated partial character strings at maximum is checked. FIG. 17 is a graph showing the result. Japanese and English have different peak, but if it is assumed that Japanese and English are the maximum alphabet set and the minimum alphabet set, respectively, it is thought that almost all languages belong to this range, and the largest difference N=5 between Japanese and English is decided as an optimized value.

An update history between documents (texts) can be reproduced using the text updated degree evaluation algorithm. Such an application will now be explained with reference to an example case where the algorithm is applied to the foregoing revision histories 1 to 5. Table 2 shows a list of evaluation results of edited point numbers of respective revision histories 1 to 5.

TABLE 1

| Text before updating | Text after updating | Text length after updating (L) | Edited point number (EP) | Context edit distance (CED) | New creation percentage (NCP) | New creation novelty degree | Text updated degree |
|---|---|---|---|---|---|---|---|
| Revision history 1 | Revision history 2 | 93088 | 22 | 2 | 0.046 | 0.957 | 4866 |
| Revision history 2 | Revision history 3 | 99709 | 82 | 28 | 0.080 | 0.949 | 12426 |
| Revision history 3 | Revision history 4 | 100215 | 8 | 0 | 0.006 | 0.955 | 805 |
| Revision history 4 | Revision history 5 | 103600 | 4 | 0 | 0.033 | 0.998 | 3492 |

According to table 1, calculation is carried out in such a way that a determination threshold value t for a common part character string=25, the length N of an N-gram=5, and coefficients a, b in an evaluation equation of a text updated degree=25, 100, respectively.

Here, an explanation will be given of optimization of the determination threshold value t for a common part character string and N used for calculating a new creation novelty degree. An analysis using a language model handling the occurrence frequency of successive characters having a length N so called N-gram is performed, a rate of partial character strings matching in the same text (N-gram duplication rate) and a rate of partial character strings matching between different texts (N-gram matching rate) are checked to optimize the threshold value t. In texts acquired at random,

TABLE 2

|  | Revision history 1 | Revision history 2 | Revision history 3 | Revision history 4 | Revision history 5 |
|---|---|---|---|---|---|
| Revision history 1 |  | 22 | 98 | 106 | 106 |
| Revision history 2 |  |  | 82 | 90 | 90 |
| Revision history 3 |  |  |  | 8 | 12 |
| Revision history 4 |  |  |  |  | 4 |
| Revision history 5 |  |  |  |  |  |

A left label in the table is an item corresponds to the text x, and an upper label corresponds to the text y. Edited points are symmetrical for x and y, only one side of the table shows the results. In the case of wordsmith by the same writer, it is confirmed that the edited point number increases along time series, so that in normal, the edited point number increases by text updating but does not decrease unless an editing work of deleting a character string confirmed as a common part character string up to a length less than or equal to the threshold value t is carried out. Accordingly, it is thought that the order of individual texts can be decided based on the magnitude relation of the edited point number to reproduce a revision history, but in actual revision history reproduction, it is desirable to perform determination together with an evaluation of a context edit distance to be discussed later.

Table 3 shows evaluation results of context edit distances for revision histories 1 to 5.

TABLE 3

| | Revision history 1 | Revision history 2 | Revision history 3 | Revision history 4 | Eevision history 5 |
|---|---|---|---|---|---|
| Revision history 1 | | 2 | 30 | 30 | 30 |
| Revision history 2 | | | 28 | 28 | 28 |
| Revision history 3 | | | | 0 | 0 |
| Revision history 4 | | | | | 0 |
| Revision history 5 | | | | | |

A context edit distance is 0 among revision histories 3 to 5, and such editing are in a similar positional relationship in viewing time series. Context edit distances are 30 and 28 when revision history 3 is viewed from revision history 1 and revision history 2, so that revision history 2 is much similar to revision history 3. Note that a context edit distance is 2 when revision history 2 is viewed from revision history 1.

Figure 18:
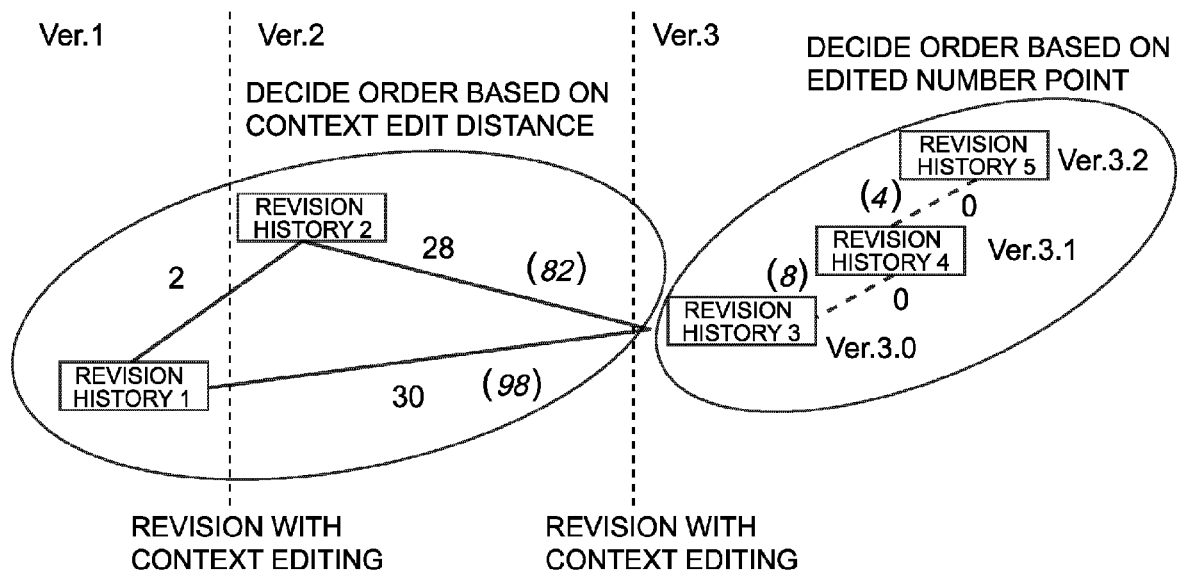
FIG. 18 is an explanatory diagram showing a positional relationship between a context edit distance and an edited point number in the case of "wordsmith by the same writer"

FIG. 18 illustrates a positional relationship in text updating based on an evaluation by a context edit distance and an evaluation by an edited point number. In the figure, the order of respective texts is decided based on a context edit distance (shown by non-parenthetic number) and an edited point number (shown by a parenthetic number). It is not possible to decide the order relationship of revision histories 3 to 5 only with a context edit distance, but it becomes clear that updating is highly-possibly carried out in the order of revision histories 3 to 5 when an edited point number from revision history 2 is reviewed. Let us suppose that a change by a context edit distance corresponds to a text version level 1, and a change by an edited point number corresponds to a text version level 2, then no updating searched as a context change occurs in revision histories 3 to 5, but it can be considered that revision by some addition is carried out twice. An updating history is reproduced in the foregoing fashion.

As explained above, the text updated degree evaluation program 10 of the embodiment allows the computer 1 to execute an extraction step of extracting common part character strings cn having a length greater than or equal to the arbitrarily threshold value t from the comparison-target original and updated texts x, y, and a step of subtracting 1 from the element number |C| of a common part character string set C which corresponds to a number of extracted common part character strings cn to acquire an edited point number EP.

It is focused on that character strings originating from original character strings are divided when editing works, such as newly creation, deletion and substitution are performed, and a number of edited points where editing is performed is acquired while putting portions, on which fine editing works, such as insertion or deletion of a relatively-short character like a single letter or a single word, correction of typo, correction of grammar, and substitution of a word are performed, together. Accordingly, in regard to evaluation of perspective text updated degree, it is expected that an evaluation which is similar to the feeling of a human who sees an edited text like "roughly how many portions in a text are edited".

Therefore, it becomes possible to quantify and evaluate the degree of editing by an editor, a change history between plural texts from the same original text can be estimated, and the degree of plagiarism like fraudulent use or copyright infringement can be quantitatively grasped.

The text updated degree evaluation program 10 of the embodiment allows the computer 1 to execute: an extraction step of extracting common part character strings cn each comprising successive plural characters and each having a length greater than or equal to an arbitrary threshold value t from original and updated texts x, y subjected to comparison with each other; a step of arranging the common part character strings cn in an order that the common part character strings occur in the respective texts, to create divided lines c0c1c2c3, c0c1c3c2; and a step of comparing the divided lines with each other, calculating a minimum number of substitution among the common part character strings cn necessary to cause one divided line c0c1c2c3 to match another divided line c0c1c3c2, thereby acquiring a context edit distance CED.

It is focused on that only substitution work of changing the order of character strings common to original and updated texts is performed in a context editing work, such as recombination of theses across entire character string, or changing an order thereof, and a computation target is limited to a common part character string cn on which a substitution work is performed, so that only edit distance can be calculated for context editing without focusing on editing works other than context editing, such as newly insertion or deletion of a character. Accordingly, a text updated degree can be evaluated from the standpoint of context editing.

The text updated degree evaluation program 10 of the embodiment allows the computer 1 to execute: an extraction step of extracting a common part character string cn having a length greater than or equal to an arbitrary threshold value t from original and updated texts x, y subjected to comparison with each other; and a step of calculating a rate of a total length $\Sigma\alpha n$, $\Sigma\beta n$ of remaining character strings obtained by eliminating the common part character string from the text with respect to a total length of that text x, y, thereby acquiring a new creation percentage.

It becomes possible to evaluate how much newly created texts are created and added with respect to the total length of the updated text. Accordingly, a text updated degree can be evaluated from the standpoint of newly creation.

The updated degree evaluation program 10 of the embodiment allows the computer 1 to execute: an extraction step of extracting a common part character string cn having a length greater than or equal to an arbitrary threshold value t from original and updated texts x, y subjected to comparison with each other; a step of collecting remaining character strings $\alpha n$, $\beta n$ obtained by eliminating the common part character string from each text to create non-common part character string sets A, B; and a novelty degree evaluation step of acquiring a new creation novelty degree DO which is a non-matching rate of an N-gram in a length less than the threshold value among non-common part character string sets, wherein the new creation novelty degree DO is expressed by the following equation 7.

$$DO = 1 - |\Gamma_1 \cap \Gamma_2|/|\Gamma_1|$$ [Equation 7]

(Where $\Gamma_1$ and $\Gamma_2$ are N-gram sets each created from a non-common part character string set, $|\Gamma_1 \cap \Gamma_2|$ is a number of common elements commonly occurring in the N-gram sets $\Gamma_1$ and $\Gamma_2$, and $|\Gamma_1|$ is a total number of N-grams contained in the N-gram set $\Gamma_1$.)

This enables evaluation of a novelty of a portion added by updating in an updated text. Accordingly, it is possible to evaluate a text updated degree from the standpoint of a novelty of a newly created portion relative to an original text.

According to the text updated degree evaluation program 10 of the embodiment, the number of common elements $|\Gamma_1 \cap \Gamma_2|$ is acquired by: coupling a first character string and a second character string, corresponding to respective non-common part character string sets A, B created from the original and updated texts x, y, with a terminal symbol $; creating a suffix array for a coupled character string to calculate a height array, and comparing a numerical value of an index of a suffix with a character string length of the first character string which is a front part of the coupled character string, when the suffix array is created; dividing into a group that a starting part of a suffix begins with the first character string and a group that a starting part of a suffix begins with the second character string; and counting a number of occurrence of a partial character string which matches at the beginning between adjoining suffix arrays, wherein an adjoining suffix array is another group and corresponds to a position having a height greater than or equal to a predetermined value N.

According to this structure, it becomes possible to determine whether a matching pattern is a pattern contained in separate texts or a pattern contained in the same text, and to search a partial character string common in non-common part character string sets with little computation effort. Accordingly, a computation effort when a number of common elements in N-gram sets is reduced, and the feasibility and the execution speed when the text updated degree evaluation program is run on the computer 1 are improved.

The text updated degree evaluation program 10 of the embodiment allows the computer 1 to execute a step of calculating a character string updated degree from an evaluation equation: a·EP+b·CED+NCP·DO·L (where EP is a number of edited points, CED is a context edit distance, NCP is a new creation percentage, DO is a new creation novelty degree, L is a total length of an updated text, and a and b are arbitrary coefficients), using a number of edited points, a context edit distance, a new creation percentage, and a new creation novelty degree acquired through the respective steps of claims 1 to 5.

According to this structure, work types, such as (1) insertion or deletion of a relatively-short character like a single character or a single word, correction of typo, correction of grammar, and substitution of a word, (2) recombination of theses across entire character strings, changing an order thereof, and editing of a context, (3) new creation and addition can be evaluated with evaluation items, such as a number of edited points, a context edit distance, a new creation percentage, and a new creation novelty degree, so that intellectual works like editing and updating of a character string can be evaluated as an accumulation of a work quantity based on the work type. Therefore, all intellectual works through editing and updating of a text can be quantitatively checked.

The text updated degree evaluation program 10 of the embodiment allows the computer 1 to execute: an extraction step of extracting common part character strings cn each having a length greater than or equal to an arbitrary threshold value from original and updated texts x, y subjected to comparison with each other; a step of subtracting 1 from a number of extracted common part character strings cn to acquire a number of edited points EP; and a step of deciding an update order of each text based on a magnitude relation of a number of edited point EP.

According to this structure, it becomes possible to evaluate a character string updated degree and to reproduce a revision history by deciding an update order from the number of edited points acquired between plural texts. Therefore, it is possible to select a desired version of a text among plural texts.

The text updated degree evaluation program 10 of the embodiment allows the computer 1 to execute:

an extraction step of extracting common part character strings cn each having a length greater than or equal to an arbitrary threshold value t from original and updated texts x, y subjected to comparison with each other; a step of arranging the common part character strings cn in an order that the common part character strings occur in each text, to create divided lines; a step of comparing the divided lines with each other, calculating a minimum number of substitution among the common part character strings necessary to cause one divided line to match another divided line, thereby acquiring a context edit distance CED; and a step of deciding an update order of each text based on a magnitude relation of a context edit distance.

According to this structure, it becomes possible to evaluate a character string updated degree and to reproduce a revision history by deciding an update order from the context edit distance acquired between plural texts. Therefore, it is possible to select a desired version of a text among plural texts.

According to the text updated degree evaluation program 10 of the embodiment, the extraction step: couples a first character string and a second character string, corresponding to respective original and updated texts x, y, with a terminal symbol $; creates a suffix array SA for a coupled character string to calculate a height array H, and compares a numerical value of an index of a suffix with a character string length of the first character string which is a front part of the coupled character string, when the suffix array SA is created; divides into a group that a starting part of a suffix begins with the first character string and a group that a starting part of a suffix begins with the second character string; and extracts a character string as a longest common part character string c0 which matches at the beginning between adjoining suffix arrays SA from the texts x, y, wherein an adjoining suffix array is another group and corresponds to a position having a highest height; and repeats extracting longest common part character string c1 to n from remaining character strings until the length of the longest common part character string becomes less than or equal to the threshold value t.

According to this structure, it becomes possible to determine whether a searched longest common part character string cn is a character string contained in separate texts or a character string contained in the same text, and to search a longest common part character string common in respective texts with a little computation effort. Therefore, the feasibility and the execution speed when the text updated degree evaluation program is run on the computer 1 are improved while reducing a computation effort for performing character string comparison between texts.

Moreover, according to the text updated degree evaluation program 10, in the extraction step, a common part character string cn is replaced with another special character when extracted.

This makes it possible to suppress any accidental occurrence of a common part character string having a length greater than or equal to a predetermined length in remaining character strings acquired after a common part character string is extracted. Accordingly, extraction of a common part character string can be performed more precisely.

According to the text updated degree evaluation program 10 of the embodiment, the extraction step extracts a character string from the texts x, y as a common part character string cn corresponding to a portion where an offset of a dot plotted on a dot matrix, created by comparing the texts with each other, from the center of the dot matrix successively appears as a constant value over predetermined number of times greater than or equal to the threshold value t.

This enables searching of a common part character string cn using a dot matrix, thereby facilitating searching of a common part character string cn.

The text updated degree evaluation program 10 of the embodiment allows the computer 1 to execute: an extraction step of extracting common part character strings cn each having a length greater than or equal to an arbitrary threshold value t from original and updated texts x, y subjected to comparison with each other; arranging the common part character strings cn in an order that the common part character strings occur in each text where extraction is performed, to create divided lines; and a step of comparing the divided lines with each other created from each text x, y, plotting each character, constituting a common part character string in matching per common part character string unit contained in each divided line, as a dot, thereby creating a dot matrix, and displaying the dot matrix.

According to this structure, in evaluating a character string updated degree, by creating a dot matrix having a dot element which is not each character constituting a character string but is a common part character string, only the degree of change in character string pattern due to an editing work performed on a character string common in original and updated texts is plotted as a dot, so that the tendency of the editing work through entire character strings can be visually displayed. Therefore, a text updated degree can be grasped visually.

The present invention is not limited to the foregoing embodiment, and can be changed and modified in various forms within the scope of the present invention. It is needless to say that the present invention can be applied to texts in all kinds of languages and formed with all kinds of data formats. The method of extracting a common part character string from texts and the method of acquiring a common element among non-common part character string sets are not limited to any particular methods.

For example, in the foregoing embodiment, the explanation has been given of the case where the present invention is applied to a text which has plural character strings connected together as sentences that expresses an organized idea, but the present invention is not limited to this case, and the character strings may be a character string by a program language, a character string that sound data is converted, a character string that the base sequence data of a DNA (Deoxyribo Nucleic Acid), and other kinds of character strings. When the character string updated degree evaluation process (see FIG. 3) according to the foregoing embodiment is performed on a character string by a program language, the amount of intellectual work like alteration of a program language can be grasped quantitatively, so that the degree how much a software is developed and the work quantity thereof can be evaluated.

Figure 19:
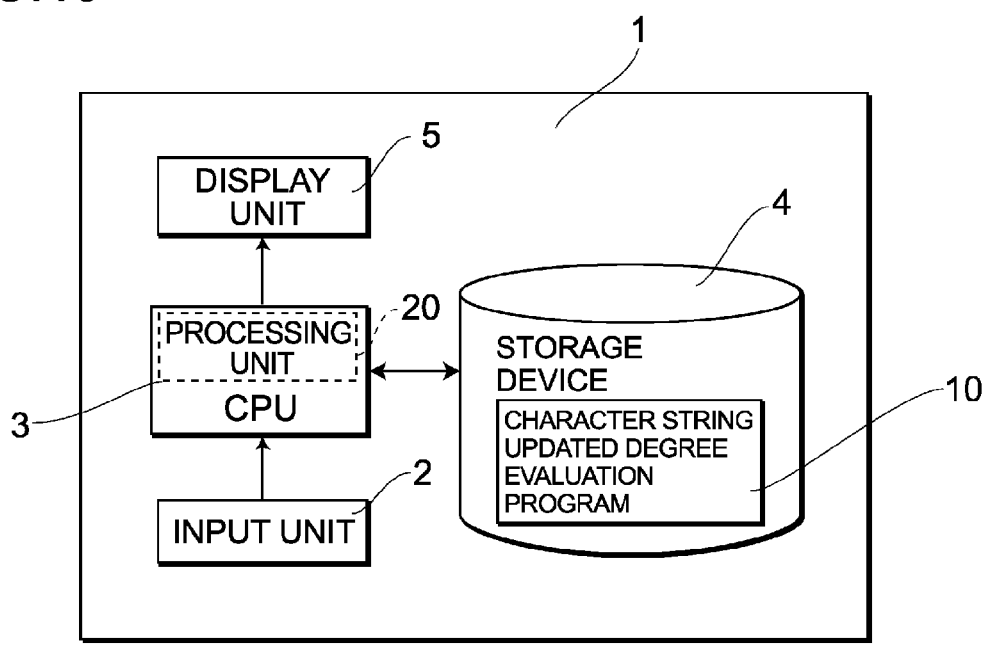
FIG. 19 is a block diagram showing the general structure of a computer in which the text updated degree evaluation program of the present invention is installed according to another embodiment.

When the text updated degree evaluation program of the present invention is applied to quantitatively grasping a change in sound data, as shown in FIG. 19 where the same structural parts as those in FIG. 1 are denoted by the same reference numerals, the CPU 3 has a processing unit 20 which converts sound data comprising frequency components into predetermined character strings, and thus the text updated degree evaluation process (see FIG. 3) according to the foregoing embodiment can be performed on such character strings, thereby enabling quantitative grasping of the amount of intellectual work like alteration of the sound data or editing thereof. Therefore, according to the text updated degree evaluation program, it becomes easy to detect infringement of a music copyright and a copyright related right due to unauthorized alteration of sound data by quantitatively grasping the amount of intellectual work.

Further, according to the text updated degree evaluation program of the present invention, the processing unit 20 shown in FIG. 19 converts the base sequence of an DNA into predetermined character strings, so that the text updated degree evaluation process (see FIG. 3) of the present invention can be performed on such character strings, thereby enabling quantitative grasping of the degree of recombination of genes or the like.

The invention claimed is:

1. A non-transitory computer readable medium having stored thereon a character string updated degree evaluation program allowing a computer to execute:
   an extraction step of extracting common part character strings each comprising successive plural characters and each having a length greater than or equal to an arbitrary threshold value from original and updated texts subjected to comparison with each other;
   a step of arranging the common part character strings in an order that the common part character strings occur in the respective texts, to create divided lines; and
   a step of comparing the divided lines with each other, calculating a minimum number of substitution among the common part character strings necessary to cause one divided line to match another divided line, thereby acquiring a context edit distance, comprising:
   a step of subtracting 1 from a number of extracted common part character strings to acquire an edited point number as a number of edited points where editing is performed;
   a step of calculating a rate of a total length of remaining character strings obtained by eliminating the common part character strings from the text with respect to a total length of that text;
   a step of collecting remaining character strings obtained by eliminating the common part character strings from each text to create a non-common part character string set, and a novelty degree evaluation step of acquiring a new creation novelty degree DO which is a non-matching rate of an N-gram in a length less than the threshold value among non-common part character string sets, wherein the new creation novelty degree DO is expressed by $DO = 1 - |\Gamma_1 \cap \Gamma_2|/|\Gamma_1|$ (where $\Gamma_1$ and $\Gamma_2$ are N-gram sets each created from a non-common part character string set, $|\Gamma_1 \cap \Gamma_2|$ is a number of common elements commonly occurring in the N-gram sets $\Gamma_1$ and $\Gamma_2$, and $|\Gamma_1|$ is a total number of N-grams contained in the N-gram set $\Gamma_1$); and
   a step of calculating a character string updated degree from an evaluation equation: $a \cdot EP + b \cdot CED + NCP \cdot DO \cdot L$ (where EP is a number of edited points, CED is a context edit distance, NCP is a new creation percentage, DO is a new creation novelty degree, L is a total length of an updated text, and a and b are arbitrary coefficients), using the number of edited points, the context edit distance, the new creation percentage, and the new creation novelty degree.

2. A non-transitory computer readable medium having stored thereon a character string updated degree evaluation program, allowing a computer to execute:
an extraction step of extracting common part character strings each having a length greater than or equal to an arbitrary threshold value from original and updated texts subjected to comparison with each other; and
a step of subtracting 1 from a number of extracted common part character strings to acquire an edited point number as a number of edited points where editing is performed,
wherein the extraction step comprises the step of:
coupling a first character string and a second character string, corresponding to respective original and updated texts, with a terminal symbol;
creating a suffix array for a coupled character string to calculate a height array, and compares a numerical value of an index of a suffix with a character string length of the first character string which is a front part of the coupled character string, when the suffix array is created;
dividing into a group that a starting part of a suffix begins with the first character string and a group that a starting part of a suffix begins with the second character string; and
extracting a character string as a longest common part character string which matches at the beginning between adjoining suffix arrays from the text, wherein an adjoining suffix array is another group and corresponds to a position having a highest height; and
repeating extracting a longest common part character string from remaining character strings until the length of the longest common part character string becomes less than or equal to the threshold value,
wherein the extraction step replaces a common part character string with another special character when extracting the common part character string.

3. A non-transitory computer readable medium having stored thereon a character string updated degree evaluation program, allowing a computer to execute:
an extraction step of extracting common part character strings each having a length greater than or equal to an arbitrary threshold value from original and updated texts subjected to comparison with each other; and
a step of subtracting 1 from a number of extracted common part character strings to acquire an edited point number as a number of edited points where editing is performed,
wherein the extraction step comprises the step of extracting a character string from the text as a common part character string corresponding to a portion where an offset of a dot plotted on a dot matrix, created by comparing the texts with each other, from the center of the dot matrix successively appears as a constant value over predetermined number of times greater than or equal to the threshold value.

4. The non-transitory computer readable medium having stored thereon the character string updated degree evaluation program according to claim 1, wherein the extraction step comprises the steps of:
coupling a first character string and a second character string, corresponding to respective original and updated texts, with a terminal symbol;
creating a suffix array for a coupled character string to calculate a height array, and compares a numerical value of an index of a suffix with a character string length of the first character string which is a front part of the coupled character string, when the suffix array is created;
dividing into a group that a starting part of a suffix begins with the first character string and a group that a starting part of a suffix begins with the second character string; and
extracting a character string as a longest common part character string which matches at the beginning between adjoining suffix arrays from the text, wherein an adjoining suffix array is another group and corresponds to a position having a highest height; and
repeating extracting a longest common part character string from remaining character strings until the length of the longest common part character string becomes less than or equal to the threshold value,
wherein the extraction step replaces a common part character string with another special character when extracting the common part character string.

5. A non-transitory computer readable medium having stored thereon a character string updated degree evaluation program allowing a computer to execute:
an extraction step of extracting common part character strings each having a length greater than or equal to an arbitrary threshold value from original and updated texts subjected to comparison with each other;
a step of subtracting 1 from a number of extracted common part character strings to acquire a number of edited points; and
a step of deciding an update order of each text based on a magnitude relation of a bumber of edited point,
wherein the extraction step comprises the steps of:
coupling a first character string and a second character string, corresponding to respective original and updated texts, with a terminal symbol;
creating a suffix array for a coupled character string to calculate a height array, and compares a numerical value of an index of a suffix with a character string length of the first character string which is a front part of the coupled character string, when the suffix array is created;
dividing into a group that a starting part of a suffix begins with the first character string and a group that a starting part of a suffix begins with the second character string; and
extracting a character string as a longest common part character string which matches at the beginning between adjoining suffix arrays from the text, wherein an adjoining suffix array is another group and corresponds to a position having a highest height; and
repeating extracting a longest common part character string from remaining character strings until the length of the longest common part character string becomes less than or equal to the threshold value,
wherein the extraction step replaces a common part character string with another special character when extracting the common part character string.

6. The non-transitory computer readable medium having stored thereon the character string updated degree evaluation program according to claim 1, wherein the extraction step comprises the step of extracting a character string from the text as a common part character string corresponding to a portion where an offset of a dot plotted on a dot matrix, created by comparing the texts with each other, from the center of the dot matrix successively appears as a constant value over predetermined number of times greater than or equal to the threshold value.

7. A non-transitory computer readable medium having stored thereon a character string updated degree evaluation program allowing a computer to execute:

an extraction step of extracting common part character strings each having a length greater than or equal to an arbitrary threshold value from original and updated texts subjected to comparison with each other;

a step of subtracting 1 from a number of extracted common part character strings to acquire a number of edited points; and a step of deciding an update order of each text based on a magnitude relation of a bumber of edited point, wherein the extraction step comprises the step of extracting a character string from the text as a common part character string corresponding to a portion where an offset of a dot plotted on a dot matrix, created by comparing the texts with each other, from the center of the dot matrix successively appears as a constant value over predetermined number of times greater than or equal to the threshold value.

* * * * *